United States Patent
Merk et al.

(10) Patent No.: US 12,164,045 B2
(45) Date of Patent: Dec. 10, 2024

(54) METHOD FOR DETERMINING AN ANGLE OF ARRIVAL, DEVICE, COMPUTER PROGRAM PRODUCT AND NON-VOLATILE STORAGE MEDIUM

(71) Applicant: u-blox AG, Thalwil (CH)

(72) Inventors: Timon Merk, Thalwil (CH); Matthias Mahlig, Thalwil (CH); Peter Karlsson, Thalwil (CH); Farshid Rezaei, Thalwil (CH)

(73) Assignee: u-blox AG, Thalwil (CH)

( * ) Notice: Subject to any disclaimer, the term of this patent is extended or adjusted under 35 U.S.C. 154(b) by 236 days.

(21) Appl. No.: 17/691,714

(22) Filed: Mar. 10, 2022

(65) Prior Publication Data
US 2022/0308151 A1 Sep. 29, 2022

(30) Foreign Application Priority Data
Mar. 29, 2021 (EP) .................... 21165571

(51) Int. Cl.
*G01S 3/48* (2006.01)
*G01S 3/74* (2006.01)
(Continued)

(52) U.S. Cl.
CPC .................. *G01S 3/48* (2013.01); *G01S 3/74* (2013.01); *G01S 11/06* (2013.01); *G06N 3/045* (2023.01);
(Continued)

(58) Field of Classification Search
CPC ... G01S 3/48; G01S 3/74; G01S 11/06; H04B 17/327; H04B 17/391; H04B 7/0697; G06N 3/045; G06N 3/08
(Continued)

(56) References Cited

U.S. PATENT DOCUMENTS

| 10,794,983 | B1 | 10/2020 | Chandail et al. |
| 2019/0274112 | A1* | 9/2019 | Kleinbeck ............. H04B 17/26 |
| 2020/0191913 | A1 | 6/2020 | Zhang et al. |

FOREIGN PATENT DOCUMENTS

| JP | 2020088529 A | * | 6/2020 |
| WO | WO 2018/169659 | | 9/2018 |
| WO | WO 2021/016003 | | 1/2021 |

OTHER PUBLICATIONS

EP Extended Search Report in European Appln. No. 21165571.7, dated Aug. 31, 2021, 9 pages.

* cited by examiner

*Primary Examiner* — Harry K Liu
(74) *Attorney, Agent, or Firm* — Fish & Richardson P.C.

(57) ABSTRACT

The present disclosure relates to a method for determining an angle of arrival, AoA, of received radio frequency, RF, measurement signals. The method comprises obtaining measurement data based on the received RF measurement signals from an antenna array, wherein the RF measurement signals are representative of multiple frequency channels. The method further comprises determining power spectra, comprising determining at least one power spectrum for each of the multiple frequency channels by using the measurement data. The method further comprises providing a machine learning algorithm, which is pre-trained to determine an AoA based on power spectra of multiple frequency channels. The method further comprises determining the AoA of the received RF measurement signals by using the machine learning algorithm and the determined power spectra.

14 Claims, 3 Drawing Sheets

(51) Int. Cl.
*G01S 11/06* (2006.01)
*G06N 3/045* (2023.01)
*G06N 3/08* (2023.01)
*H04B 7/06* (2006.01)
*H04B 17/327* (2015.01)
*H04B 17/391* (2015.01)

(52) U.S. Cl.
CPC ............. *G06N 3/08* (2013.01); *H04B 7/0697* (2013.01); *H04B 17/327* (2015.01); *H04B 17/391* (2015.01)

(58) Field of Classification Search
USPC ......................................................... 342/424
See application file for complete search history.

METHOD FOR DETERMINING AN ANGLE OF ARRIVAL, DEVICE, COMPUTER PROGRAM PRODUCT AND NON-VOLATILE STORAGE MEDIUM

CROSS-REFERENCE TO RELATED APPLICATIONS

This application claims priority to European Application No. EP21165571.7, filed on Mar. 29, 2021, the contents of which are incorporated herein by reference in their entirety.

TECHNICAL FIELD

This disclosure relates to a method for determining an angle of arrival of received radio frequency measurement signals. The disclosure further relates to a device comprising a processing unit. The disclosure also relates to a computer program product and a non-volatile storage medium.

BACKGROUND ART

In wireless communications radio frequency, RF, signals are often transmitted from a transmitter to a receiver. When receiving such an RF signal, an angle of arrival, AoA, of the received RF signal often needs to be determined. Different signal processing algorithms may be used for determining the AoA.

However, different positioning problems may remain, such as a poor AoA estimation, for example in multipath propagation due to reflections and/or diffractions and/or scattering. Furthermore, when determining the AoA, there may exist environment specific disturbances such as so-called Non-Line of Sight, NLoS, measurements and/or so-called Obstructed Line of Sight, OLoS, measurements. Furthermore, the determination of the AoA may be influenced by imperfections relating to an antenna array used for receiving the RF signal and/or relating to RF design.

It is an object of the present disclosure to present a method, a device, a computer program product and a non-volatile storage medium, in which a reliable and robust determination of an angle of arrival of received radio frequency measurement signals is provided.

SUMMARY OF INVENTION

The above-mentioned object is solved by the subject-matter of the attached independent claims. Further embodiments are disclosed in the attached dependent claims.

According to a first aspect of the invention, a method for determining an angle of arrival, AoA, of received radio frequency, RF, measurement signals comprises the steps:
  obtaining measurement data based on the received RF measurement signals from an antenna array, wherein the RF measurement signals are representative of multiple frequency channels,
  determining power spectra, comprising determining at least one power spectrum for each of the multiple frequency channels by using the measurement data,
  providing a machine learning algorithm, which is pre-trained to determine an AoA based on power spectra of multiple frequency channels, and
  determining the AoA of the received RF measurement signals by using the machine learning algorithm and the determined power spectra.

The machine learning algorithm according to the first aspect may also be denoted as a machine learning model and/or a data driven model.

An advantage of the method according to the first aspect is that a robust and precise estimation of the AoA of the received RF measurement signals may be provided. By using a data driven model, a poor AoA determination, for example in multipath propagation due to reflections and/or diffractions and/or scattering, may be avoided. Furthermore, AoA determination under environment specific disturbances such as NLoS measurements and/or OLoS measurements may be improved. Furthermore, an influence on the AoA determination due to an imperfection of the antenna array and/or imperfect RF design, may be minimized. The use of the data driven model according to the first aspect may be more advantageous for a robust and precise determination of the AoA, compared to using conventional AoA signal processing methods.

To overcome the limitation that different antenna array types have a different geometry, such as a different number of antenna elements and/or a different size and/or a different spacing and/or a different configuration, according to the first aspect, the input features of the machine learning algorithm are defined, such that an input feature of same dimension across different antenna arrays is obtained. For example, a non-linear transformation of obtained measurement data such as IQ samples, may be transformed into an input feature of same dimension across different antenna arrays.

In this way, the respective determined power spectrum is representative of a vector of estimations of different angles, also denoted as pseudo spectrum.

The AoA is the direction from which the RF measurement signals are received. For example, the AoA may be representative of a vector and the AoA may comprise an azimuth AoA and/or an elevation AoA.

The RF measurement signals may be arbitrary RF measurement signals, for example, Wi-Fi measurement signals, Bluetooth measurement signals, ultra-wideband measurement signals or the like.

The antenna array may also be denoted as a multi antenna. For example, the antenna array may comprise two or more antenna elements. The antenna array may be of an arbitrary form and/or shape, and may be, for example, a circular antenna array. Alternatively, the antenna array may comprise at least two antenna rows. For example, each antenna row may comprise two or more antenna elements.

The multiple frequency channels have different frequencies and may also be denoted as multiple frequency bands. In other words, by using RF measurement signals of multiple frequency channels, the AoA determination may be performed for a multi-frequency scenario.

Furthermore, by using the RF measurement signals of multiple frequency channels, the determination of the AoA may be more robust and more precise compared to using RF measurement signals of a single frequency channel. For example, when the antenna array is arranged in an indoor or constrained outdoor multipath environment, using the RF measurement signals of multiple frequency channels may particularly improve the AoA determination.

The machine learning algorithm is pre-trained by using pre-train data. The pre-train data comprises training data and/or testing data and/or validation data. The pre-training is performed by using one or more appropriate machine learning training algorithms, depending on the specific machine learning algorithm used to perform the method according to the first aspect. Furthermore, the machine learning algorithm may be easily integrated and operate very efficient in embedded systems with less resources, particularly when performing the method according to the first aspect.

The determining the AoA of the received RF measurement signals by using the machine learning algorithm and the determined power spectra comprises using the determined power spectra as input features of the machine learning algorithm. The input features of the machine learning algorithm may also be denoted as input parameters of the machine learning algorithm.

For example, the determined power spectra may comprise one or more pseudo spectra in an angular domain and/or one or more pseudo spectra in a spatial domain.

For example, different frequency channels and different antenna element rows may be combined for the input features of the machine learning algorithm.

Additionally or alternatively the determined power spectra, in other words, the raw power spectra, may be further processed before determining the AoA. In this case, a processed power spectrum is determined for each previously determined power spectrum based on the respective power spectrum. Then the AoA is determined by using the processed power spectra as input features of the machine learning algorithm. The processed power spectrum may, for example, be representative of a maximum of the respective raw power spectrum and/or of a variance of the respective raw power spectrum and/or of a line length of the respective raw power spectrum and/or a band power of the respective raw power spectrum or the like. For example, the raw power spectrum may also be denoted as pseudo spectrum in the spatial domain.

The method according to the first aspect may be a computer-implemented method.

According to one embodiment each power spectrum is a power spectral density, PSD.

Each PSD is a spatial PSD and is determined across an azimuth plane and an elevation plane.

According to a further embodiment the determining of the power spectra comprises performing PSD-based signal processing.

According to a further embodiment the PSD-based signal processing comprises a multiple signal classification, MUSIC, algorithm. Additionally or alternatively the PSD-based signal processing comprises a propagator direct data acquisition, PDDA, algorithm. Additionally or alternatively the PSD-based signal processing comprises a self-signal suppression, SSS, algorithm.

PSD-based signal processing algorithms, as the ones listed above, are impairing by one or more of the following factors: antenna specific imperfections and/or design related impurities and/or multipath components and/or reflections and/or frequency dependencies. By determining the AoA by using the machine learning algorithm and the power spectra on which PSD-based processing has been performed, the AoA estimation is more robust to these impairing factors.

According to a further embodiment the method further comprises the steps:
determining a quality indicator by using the measurement data, wherein the quality indicator is representative of an integrity of the received RF measurement signals, and
determining the AoA of the received RF measurement signals by using the machine learning algorithm, the determined power spectra and the quality indicator.

The quality indicator is representative of an integrity of at least one of the received RF measurement signals. Furthermore, the quality indicator may comprise multiple quality indicators, for example, one or more quality indicators corresponding to each of the received RF measurement signals.

The determining the AoA of the received RF measurement signals by using the machine learning algorithm and the quality indicator comprises using the quality indicator as an input feature of the machine learning algorithm. For example, the quality indicator may be used as an input feature parallel to the input feature represented by the determined power spectra and/or the processed power spectra.

According to a further embodiment, the quality indicator may be a received signal strength indicator, RSSI, and/or a channel state information, CSI, and/or a cyclic redundancy check, CRC, result, and/or a forward correction error, FEC, result and/or a noise analysis result of a constant tone extension or the like.

For example, the CSI may be used if the RF measurement signals are wireless local area network, WLAN, signals, such as Wi-Fi signals or the like.

For example, based on the RSSI, it may be inferred if a tag polarization is cross, co or slant polarized.

By using the quality indicator and the processed power spectra as input features for the machine learning algorithms, the robustness of the method according to the first aspect is increased, thus resulting in an improved AoA estimation.

According to a further embodiment the measurement data comprises in-phase and quadrature, IQ, data.

In this way, the power spectra may be efficiently determined based on the IQ data.

According to a further embodiment an amount of the determined power spectra is dependent on an amount of the multiple frequency channels and/or the number of antenna rows of the antenna array and/or a polarization of the antenna array.

The polarization of the antenna array may comprise a horizontal polarization and/or a vertical polarization or the like.

Furthermore, the amount of the determined power spectra may be dependent on an amount of antenna elements independently of any antenna rows. For example, in case of the circular antenna array or the like.

According to a further embodiment the machine learning algorithm comprises a classification and regression tree, CART, algorithm. Additionally or alternatively the machine learning algorithm comprises a convolutional neural networks, CNN. Additionally or alternatively the machine learning algorithm comprises a multilayer perceptron, MLP, neural network. Additionally or alternatively the machine learning algorithm comprises a random forest algorithm. Additionally or alternatively the machine learning algorithm comprises a clustering algorithm. Additionally or alternatively the machine learning algorithm comprises a support support-vector machine, SVM, algorithm. Additionally or alternatively the machine learning algorithm comprises a time dependent neuronal network, e.g. a Recurrent Neural Network, RNN, a Long Short Term Memory Network, LSTM, a Transformer or Attention networks.

The use of these machine learning algorithms may be more advantageous for a robust and precise determination of the AoA, particularly when compared to using conventional AoA signal processing methods.

The clustering algorithm may be a k-nearest neighbors algorithm, k-NN, or the like.

According to a further embodiment the method further comprises the steps:

concatenating the determined power spectra, and
determining the AoA of the received RF measurement signals by using the machine learning algorithm and the concatenated power spectra.

The term "concatenating" with respect to concatenating the determined power spectra may comprise a concatenating and/or reshaping.

The determining the AoA of the received RF measurement signals by using the machine learning algorithm and the concatenated power spectra comprises using the concatenated power spectra as input features of the machine learning algorithm.

By concatenating and/or reshaping the determined power spectra and/or the processed power spectra and/or the quality indicator, the input features of the machine learning algorithm are defined, such that an input feature of same dimension across different antenna arrays may be obtained.

According to a further embodiment the antenna array is positioned in a first environment, in particular when the RF measurement signals are received, and the machine learning algorithm is pre-trained by using pre-train data, wherein the pre-train data is determined based on the antenna array and the first environment.

Specifically, the pre-train data may be determined based on measurements performed on the antenna array and the first environment and/or associated reference data, i.e., associated outputs which are representative of a priori known AoA.

By using pre-train data which is determined based on the specific antenna array and the first environment, an inaccurate configuration of an orientation of the antenna may be avoided and antenna correction data may not be required for determining the AoA.

In this case, the machine learning algorithm is pre-trained by using a reference system comprising a specific antenna array and the first environment. In other words, the machine learning algorithm is pre-trained for one specific scenario involving the specific antenna array and a specific environment. This process may also be denoted as applying transfer learning. In this way, the machine learning algorithm may be used as a calibration in order to account for antenna specific impurities and/or scenario specific multipath components and and/or scenario specific reflections or the like when determining the AoA.

Thus, according to this embodiment, a performance beneficial implementation of the machine learning algorithm is provided.

In this case, the machine learning algorithm may comprise the CART algorithm. Thereby, a suitability for this scenario may be improved, as the CART algorithm is able to perform decisions based on one or more input features and then is able to segment data based on a statistical optimal subset of input features. Furthermore, the CART algorithm may be particularly useful in this case, as it is able to learn environment and antenna specific parameters quickly. In other words, a CART algorithm overfits easily to a given set of data.

Additionally or alternatively, in this case, the machine learning algorithm may comprise the clustering algorithm. The clustering algorithm may be particularly useful in this case, as a model underlying a non-linear segmentation function is in this sense not very complex, but is able to segment environment specific parameters quite quickly.

According to a further embodiment the machine learning algorithm is pre-trained by using pre-train data, wherein the pre-train data is determined based on multiple antenna arrays and multiple second environments.

Specifically, the pre-train data is determined based on measurements performed on the multiple antenna arrays and the multiple second environments.

By using pre-train data which is determined based on multiple antenna arrays and multiple second environments, the AoA determination may be improved independent of the specific antenna array used for performing the method according to the first aspect.

The multiple antenna arrays correspond to multiple arbitrary antennas. For example, the multiple antenna arrays are mutually different antenna arrays. The antenna array according to the first aspect may or may not be comprised in the multiple antenna arrays.

The multiple second environments correspond to arbitrary environments. For example, the multiple second environments are mutually different environments. The first environment may or may not be comprised in the multiple second environments.

In this case, the machine learning algorithm is pre-trained by using, for example, pre-train data inferred from multiple measurements performed by using the multiple antenna arrays and the multiple second environments. In other words, the machine learning algorithm is pre-trained and may be used for any arbitrary scenario. In this way, the machine learning algorithm may learn and generalize multipath components and reflection contributions according to the pre-train data.

As the pre-training is performed dependent on the multiple second environments, a problem to be solved may be more complex compared to the aforementioned scenario. Thus, in this case, it is beneficial to outperform classic and/or conventional signal processing algorithms, i.e., MUSIC, such that the machine learning algorithm needs to be capturing features across multiple antenna arrays and the multiple second environments.

In this case, it may be particularly useful if the machine learning algorithm comprises
  a deep learning approach, i.e., the MLP neural network, for example comprising at least one hidden layer, and/or the like; and/or
  a temporal and/or spatial capturing model, i.e., the CNN and/or the RNN and/or the LSTM or the like.

With regards to this embodiment and the foregoing embodiment, a distinction of these two scenarios is beneficial, for the following reason. Antenna specific artifacts and impurities constitute an issue. Therefore, it is distinguished between a specific high performing AoA Scenario and a generalizing methodology scenario.

According to a further embodiment the RF measurement signals are short-range signals.

For example, the RF measurement signals may be Bluetooth BT 5.1 signals, or the like. By performing the method according to the first aspect on received short-range signals, the determination of the AoA may be improved for an indoor environment.

According to a second aspect of the invention, a device comprises a processing unit, wherein the processing unit is configured to obtain measurement data based on received RF measurement signals from an antenna array, wherein the RF measurement signals are representative of multiple frequency channels. The processing unit is further configured to determine power spectra, comprising determining at least one power spectrum for each of the multiple frequency channels by using the measurement data. The processing unit comprises a machine learning algorithm, which is able to determine an AoA based on power spectra of multiple frequency channels, and when the machine learning algorithm is pre-trained, the processing unit is configured to determine the AoA of the received RF measurement signals by using the pre-trained machine learning algorithm and the determined power spectra.

According to a third aspect of the invention, another device is disclosed, which is configured to perform the method according to the first aspect.

The device according to the third aspect may be the device according to the second aspect or may be a different device.

According to a fourth aspect of the invention, a computer program product comprises instructions which, when executed by a computing device, cause the computing device to carry out the method according to the first aspect.

According to a fifth aspect of the invention, a non-volatile storage medium comprises a computer program product according to the fourth aspect.

Advantages and further embodiments of the second, third and fourth aspect correspond, in general, to those discussed above with respect to the first aspect.

Further embodiments and advantages are disclosed in the attached dependent claims, the figures and the description thereof. In the figures, the disclosure is presented with respect to short-range RF signals, to which the aspects of the disclosure may be applied. This example is chosen for a consistent and easily understandable presentation of the disclosure. The disclosure, however, is not limited in this regard.

DESCRIPTION OF EMBODIMENTS

Figure 1:
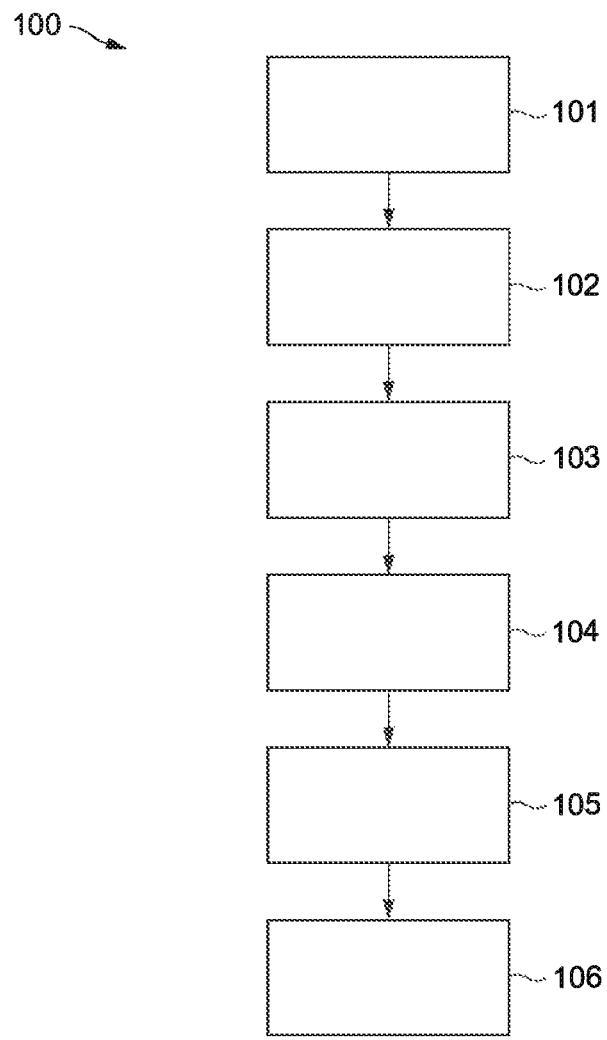
FIG. 1 shows a flowchart of a method for determining an angle of arrival.

FIG. 1 shows a flowchart of a method 100 for determining an angle of arrival, AoA, of received radio frequency, RF, measurement signals. Preferably, the RF measurement signals are short-range signals.

In a first step 101, measurement data are obtained based on the received RF measurement signals from an antenna array. The RF measurement signals are representative of multiple frequency channels. The measurement data comprises in-phase and quadrature, IQ, data.

According to a first example described herein, the antenna array according to the method 100 is a specific first antenna array, such as a unified rectified array, URA, antenna, and is positioned in a first environment when the RF measurement signals are received.

According to a second example described herein, the antenna array may be an arbitrary antenna array and may be positioned in an arbitrary environment when the RF measurement signals are received.

In a second step 102, power spectra are determined by performing PSD-based signal processing. At least one power spectrum is determined for each of the multiple frequency channels by using the measurement data obtained in the first step 101. Each power spectrum is a power spectral density, PSD. An amount of the determined power spectra is dependent on an amount of the multiple frequency channels and a number of antenna rows of the antenna array and a polarization of the antenna array.

According to the first example and the second example described herein, the PSD-based signal processing is performed by using a propagator direct data acquisition, PDDA, algorithm.

In a third step 103, the power spectra determined in the second step 102 are concatenated and/or reshaped.

Optionally, in a fourth step 104, a quality indicator is determined by using the measurement data obtained in the first step 101. The quality indicator is representative of an integrity of the received RF measurement signals.

In a fifth step 105, a machine learning algorithm is provided. The machine learning algorithm is pre-trained to determine an AoA based on power spectra of multiple frequency channels.

After a predefined time, the machine learning algorithm may be pre-trained again.

According to the first example described herein, the machine learning algorithm is a random forest algorithm. Furthermore, the machine learning algorithm, according to the first example, is pre-trained by using first pre-train data. The first pre-train data is determined based on the first antenna array and the first environment. Thus, the machine learning algorithm is pre-trained for a specific antenna array in a specific environment. The random forest algorithm, for example, comprises eleven trees and a maximum depth of five.

According to the second example described herein, the machine learning algorithm is a multilayer perceptron, MLP, neural network. Furthermore, the machine learning algorithm, according to the second example, is pre-trained by using pre-train data, wherein the pre-train data is determined based on multiple antenna arrays and multiple second environments. Thus, the machine learning algorithm is pre-trained for a wide variety of antenna arrays in various environments.

In a sixth step 106, the AoA of the received RF measurement signals is determined by using the machine learning algorithm provided in the fifth step 105 and the concatenated power spectra determined in the second step 102.

If the optional fourth step 104 is performed and the quality indicator is determined, the AoA of the received RF measurement signals is determined by additionally using the quality indicator.

Performing the method 100 according to the first example described herein, may be useful in a scenario, when a high resolution of the AoA is required, especially in a static environment. However, there is a high dependency on the trained environment. Thus, adaptive updates and/or adaptive training and/or further pre-training of the machine learning algorithm may be necessary if the first environment experiences a structural change.

Performing the method 100 according to the second example described herein, may be useful in a generalization manner across the multiple antenna arrays and the multiple second environments. In this case, the machine learning algorithm is pre-trained in different environments, optimally there is no need for adaptive updates and/or adaptive training and/or further pre-training. Weight parameters of the machine learning algorithm are fixed. Such a machine learning algorithm may be implemented in an embedded device by using storage efficient machine learning methods such as LightGBM and/or ResOT and/or FastGRNN.

Figure 2:
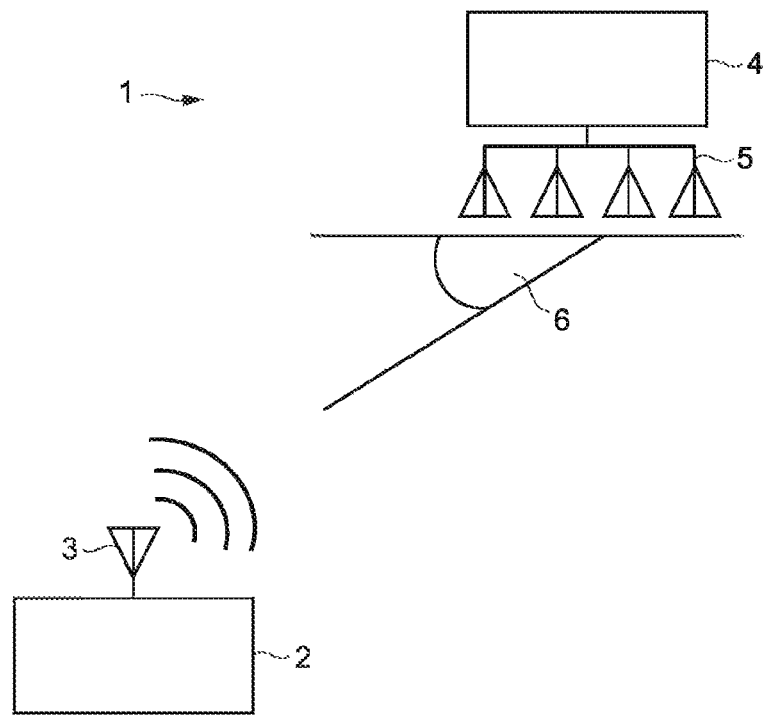
FIG. 2 shows a schematic drawing of a system for determining an angle of arrival.

A schematic drawing of a system 1 for determining an AoA 6 is shown in FIG. 2. The system comprises a transmitter 2, which is capable of transmitting RF measurement signals by using an antenna 3. The system further comprises a device 4. The device 4 is configured to perform the method as discussed with respect to FIG. 1. For example, the device 4 is configured to obtain measurement data based on the RF measurement signals, which may be received from an antenna array 5. The device 4 is further configured to determine the AoA 6 of the received RF measurement signals.

Figure 3:
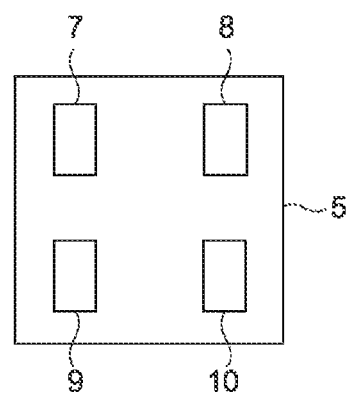
FIG. 3 shows a schematic drawing of an antenna array.

A schematic drawing of an antenna array 5 is shown in FIG. 3. The antenna array comprises, in this example, a first antenna element 7 and a second antenna element 8, which are arranged in a first antenna row of the antenna array 5. The antenna array further comprises, a third antenna element 9 and a fourth antenna element 10, which are arranged in a second antenna row of the antenna array 5. The antenna array 5 may, of course, comprise more or less antenna elements than depicted in FIG. 3, which may be arranged in an arbitrary number of antenna rows.

Figure 4:
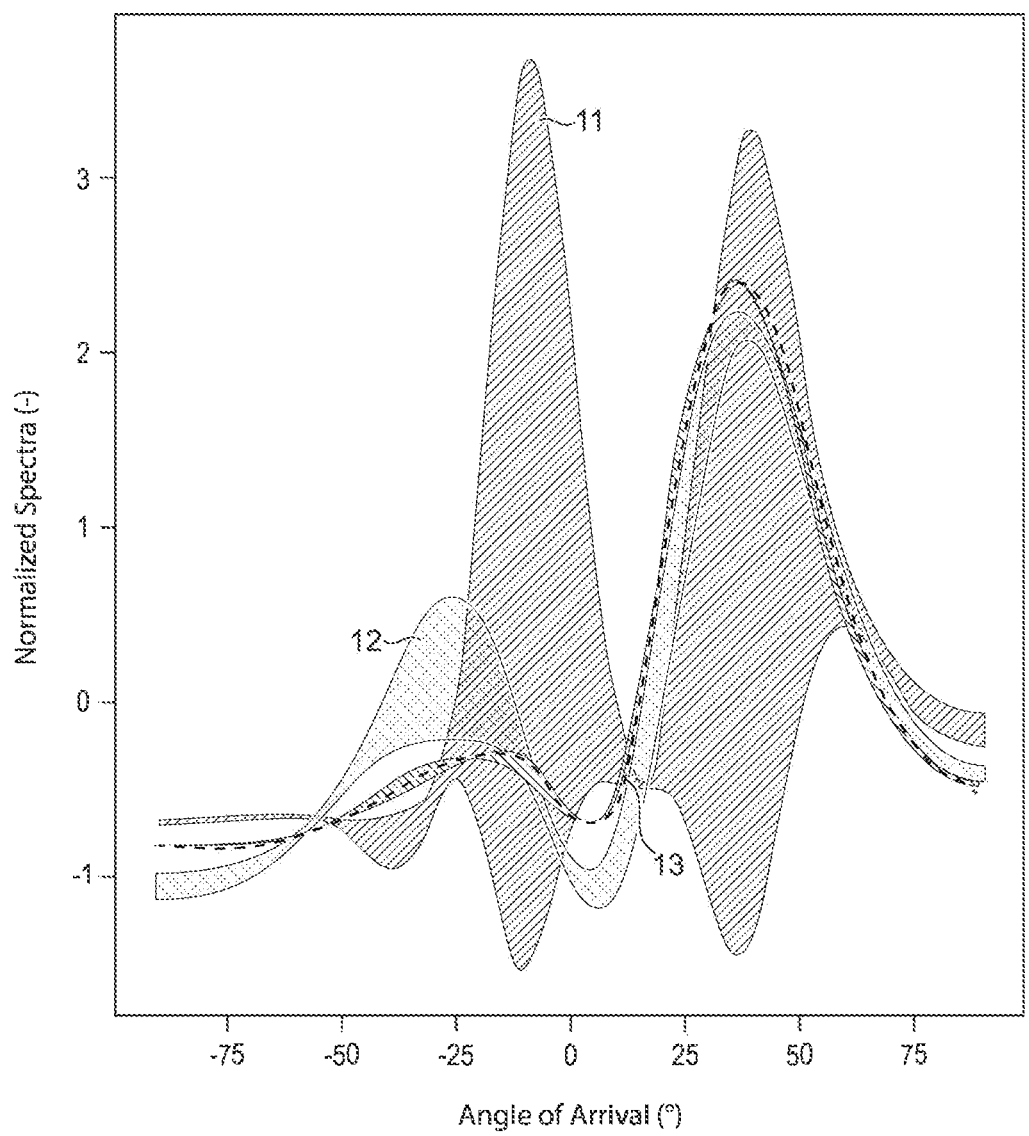
FIG. 4 shows a diagram comprising power spectra of multiple frequency channels.

A diagram comprising power spectra of multiple frequency channels is shown in FIG. 4. The diagram comprises a first axis, wherein the first axis is a horizontal axis and may be denoted as abscissa. The first axis is representative of the AoA in degree units, for example an elevation AoA. The diagram further comprises a second axis, wherein the second axis is a vertical axis and may be denoted as ordinate. The second axis is representative of normalized spectra.

The diagram depicts a first power spectra 11 of a first frequency channel. The diagram further depicts a second power spectra 12 of a second frequency channel. The diagram even further depicts a third power spectra 13 of a third frequency channel. The first power spectra 11, the second power spectra 12 and the third power spectra 13 are determined by performing PSD-based signal processing comprising the PDDA algorithm. The power spectra according to FIG. 4 are normalized power spectra and have been determined by using measurement data based on short range RF measurement signals. The AoA, i.e., the elevation AoA, 6 of these short range RF measurement signals is 40 degrees.

The short range RF measurement signals are representative of an indoor environment. As depicted in FIG. 4, the power spectra are indicative of significant PDDA AoA prediction errors, for example, when compared to PDDA AoA prediction errors for an outdoor environment. Thus, from FIG. 4, it may be derived that there are frequency channel specific variations. A naïve approach would be to determine a mean of the PDDA peaks. However, as it may be derived that, i.e., first power spectra 11 receives a considerable reflection, the machine learning algorithm according to the method 100 may be applied. In this way, environment and antenna specific spatial spectrum distributions can be learned.

LIST OF REFERENCE SIGNS

100 method for determining an angle of arrival
101-106 steps
1 system
2 transmitter
3 antenna
4 device
5 antenna array
6 angle of arrival
7 first antenna element
8 second antenna element
9 third antenna element
10 fourth antenna element
11 first power spectra
12 second power spectra
13 third power spectra

The invention claimed is:

1. A method for determining an angle of arrival (AoA) of received radio frequency (RF) measurement signals, the method comprising:
   obtaining measurement data based on the received RF measurement signals from an antenna array, wherein the RF measurement signals are representative of multiple frequency channels;
   determining power spectra, comprising determining at least one power spectrum for each of the multiple frequency channels by using the measurement data;
   providing a machine learning algorithm, which is pre-trained to determine an AoA based on power spectra of multiple frequency channels; and
   determining the AoA of the received RF measurement signals by using the machine learning algorithm and the determined power spectra.

2. The method according to claim 1, wherein each power spectrum is a power spectral density (PSD).

3. The method according to claim 1 wherein determining the power spectra comprises performing power spectral density (PSD)-based signal processing.

4. The method according to claim 3, wherein the PSD-based signal processing comprises at least one of a multiple signal classification (MUSIC) algorithm, a propagator direct data acquisition (PDDA) algorithm or a self-signal suppression (SSS) algorithm.

5. The method according to claim 1, wherein the method further comprises:
   determining a quality indicator by using the measurement data, wherein the quality indicator is representative of an integrity of the received RF measurement signals, and
   determining the AoA of the received RF measurement signals by using the machine learning algorithm, the determined power spectra and the quality indicator.

6. The method according to claim 5, wherein the quality indicator comprises at least one of a received signal strength indicator (RSSI), a channel state information (CSI), a cyclic redundancy check (CRC), result, a forward correction error (FEC), result or a noise analysis result of a constant tone extension.

7. The method according to claim 1, wherein the measurement data comprises in-phase and quadrature (IQ) data.

8. The method according to claim 1, wherein an amount of the determined power spectra is dependent on at least one of an amount of the multiple frequency channels, a number of antenna rows of the antenna array, or a polarization of the antenna array.

9. The method according to claim 1, wherein the machine learning algorithm comprises at least one of a classification and regression tree (CART) algorithm, a convolutional neural networks (CNN), a multilayer perceptron (MLP) neural network, a random forest algorithm, a clustering algorithm, or a support support-vector machine (SVM) algorithm.

10. The method according to claim 1, wherein the method further comprises:
    concatenating the determined power spectra, and
    determining the AoA of the received RF measurement signals by using the machine learning algorithm and the concatenated power spectra.

11. The method according to claim 1, wherein the antenna array is positioned in a first environment when the RF measurement signals are received, and the machine learning algorithm is pre-trained by using pre-train data, wherein the pre-train data is determined based on the antenna array and the first environment.

12. The method according to claim 1, wherein the machine learning algorithm is pre-trained by using pre-train data, wherein the pre-train data is determined based on multiple antenna arrays and multiple second environments.

13. A device comprising:
a processor operable to:
obtain measurement data based on received radio frequency (RF) measurement signals from an antenna array, wherein the RF measurement signals are representative of multiple frequency channels, and
determine power spectra, comprising determining at least one power spectrum for each of the multiple frequency channels by using the measurement data, and
wherein the device further comprises at least one tangible, non-transitory, computer-readable media storing a machine learning algorithm that, when executed by the processor, causes the device to determine an angle of arrival (AoA) based on power spectra of multiple frequency channels, and wherein the processor is operable to determine the AoA of the received RF measurement signals by using a pre-trained instance of the machine learning algorithm and the determined power spectra.

14. At least one tangible, non-transitory, computer-readable media storing instructions which, when executed by a computing device, cause the computing device to perform operations comprising:
obtaining measurement data based on received radio frequency (RF) measurement signals from an antenna array, wherein the RF measurement signals are representative of multiple frequency channels;
determining power spectra, comprising determining at least one power spectrum for each of the multiple frequency channels by using the measurement data; and
determining an angle of arrival (AoA) of the received RF measurement signals by using a machine learning algorithm and the determined power spectra, wherein the machine learning algorithm is pre-trained to determine an AoA based on power spectra of the multiple frequency channels.

* * * * *